(12) United States Patent
Xin et al.

(10) Patent No.: US 9,323,068 B2
(45) Date of Patent: Apr. 26, 2016

(54) SPATIAL STEREOSCOPIC DISPLAY DEVICE AND OPERATING METHOD THEREOF

(71) Applicants: BOE Technology Group Co., Ltd., Beijing (CN); Chengdu BOE Optoelectronics Technology Co., Ltd., Chengdu (CN)

(72) Inventors: Yanxia Xin, Beijing (CN); Seungyik Park, Beijing (CN); Yuqing Yang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 265 days.

(21) Appl. No.: 13/940,423

(22) Filed: Jul. 12, 2013

(65) Prior Publication Data
US 2014/0015867 A1 Jan. 16, 2014

(30) Foreign Application Priority Data
Jul. 13, 2012 (CN) .................. 2012 2 0342721 U

(51) Int. Cl.
*G03B 21/26* (2006.01)
*G02B 27/22* (2006.01)
*H04N 9/31* (2006.01)
*H04N 13/04* (2006.01)
(Continued)

(52) U.S. Cl.
CPC .......... *G02B 27/2235* (2013.01); *G02B 27/148* (2013.01); *G02B 27/2271* (2013.01); *G09G 5/10* (2013.01); *H04N 9/3129* (2013.01); *H04N 13/049* (2013.01); *H04N 13/0497* (2013.01)

(58) Field of Classification Search
CPC ................................... H04N 9/3129
USPC .............. 345/6, 419, 564; 353/77, 37, 6
See application file for complete search history.

(56) References Cited

U.S. PATENT DOCUMENTS

| | | | | |
|---|---|---|---|---|
| 5,956,172 A | * | 9/1999 | Downing | ............... 359/326 |
| 6,512,498 B1 | * | 1/2003 | Favalora et al. | ............... 345/30 |

(Continued)

FOREIGN PATENT DOCUMENTS

JP 09265055 A 10/1997
WO WO 2012/059783 A1 * 5/2012

OTHER PUBLICATIONS

Office Action issued by the Korean Patent Office for Korean Patent Application No. 10-2013-0082964 dated May 27, 2014, 3 pgs.
(Continued)

*Primary Examiner* — Audrey Y Chang

(57) ABSTRACT

Embodiments of the invention relate to a spatial stereoscopic display device and an operating method thereof. The spatial stereoscopic display device comprises: a laser source; a two-dimensional scanning unit, receiving and projecting the laser light onto a variable isoclinic transflective unit; the variable isoclinic transflective unit, receiving and dividing the laser light into a first and second splitting lights intersecting in an imaging space, by transmission and reflection; a power source and position sensor unit, connected with the variable isoclinic transflective unit to control an intersection of the first and second splitting lights in the imaging space; the imaging space, provided with an up-conversion material inside, and the up-conversion material at the intersection of the first and second splitting lights is excited to form a light-emitting point; and the 3D modulator, connected with the laser source, the two-dimensional scanning unit, the power source and position sensor unit.

8 Claims, 1 Drawing Sheet

(51) Int. Cl.
*G09G 5/10* (2006.01)
*G02B 27/14* (2006.01)

(56) References Cited

U.S. PATENT DOCUMENTS

| | | | | |
|---|---|---|---|---|
| 8,118,674 | B2 * | 2/2012 | Burak et al. | 463/32 |
| 2007/0242324 | A1 | 10/2007 | Chen | |
| 2010/0066730 | A1 | 3/2010 | Grossman | |
| 2013/0300757 | A1 * | 11/2013 | Kimmel | 345/564 |

OTHER PUBLICATIONS

English translation of Office Action issued by the Korean Patent Office for Korean Patent Application No. 10-2013-0082964, 1pg.
Notice of Allowance issued by the Korean Patent Office for Korean Patent Application No. 10-2013-0082964 dated Nov. 28, 2014, 2 pgs.
English translation of JP09265055A; 8 pages.
English Abstract of JP09265055A; 1 page.

* cited by examiner

SPATIAL STEREOSCOPIC DISPLAY DEVICE AND OPERATING METHOD THEREOF

CROSS REFERENCE TO RELATED APPLICATIONS

This application claims priority from Chinese National Application No. 201220342721.7, filed on Jul. 13, 2012, the contents of which are incorporated herein by reference.

BACKGROUND

Embodiments of the invention relate to a spatial stereoscopic display device and an operating method thereof.

True three-dimensional (3D) display technology is a novel 3D image display technique, with a 3D image directly formed in a space. The imaging principle of the true 3D display technology is to utilize the intersecting of two intersected infrared laser beams to directly form the 3D image in a 3D data field. The technology has many advantages, such as multi-viewing-angle, all-round viewing and multi-person simultaneous observation, and shows an actual object better. In order to obtain a dynamic 3D image with good visual effect, an intersection of the two laser beams is required to move continuously along a specific addressing route, and certain scanning frequency must be guaranteed as the image integrity can only be guaranteed under higher scanning frequency. During image refreshing, the animation effect can be achieved by the change of images to be displayed.

Therefore, it is very critical to precisely control the movement of the intersection of the two laser beams along the specific addressing route. In general, scanning surfaces of the two laser beams are perpendicular to each other. FIG. 1 is a schematic diagram of a current true 3D display system. As shown in FIG. 1, the working process of displaying a 3D image of the system is simply described below: two laser beams with different wavelengths are respectively emitted by a first laser source 1-1 and a second laser source 2-1 first, converged by lenses provided to the first laser source 1-1 and the second laser source 2-1, respectively transmitted to a first photoelectric regulator 1-2 and a second photoelectric regulator 2-2 for regulation, and respectively transmitted to a first lens 1-3 and a second lens 2-3 to acquire satisfactory light sources; lights from the light sources are respectively introduced into dichroic mirrors in a XZ scanning unit 1-4 and a YZ scanning unit 2-4 for separation, and then, transmitted to respective corresponding two-dimensional scanners after separation; and hence, the two-dimensional scanners acquire correct addressing points of the lights in an imaging space 30 by the resolution and control of addresses of the lights via digital frequency synthesizers, and thus the 3D imaging in the imaging space 30 can be achieved. In addition, a computer 3 controls the position of the intersection of laser beams in the imaging space 30 through a 3D interface on a 3D modulator 24 and a 3D software, and a 3D image to be displayed is inputted into the computer 3 in a form of a space lattice or a function, so that the computer 3 can achieve real-time control via the 3D modulator 24. The true 3D display system utilizes the addressing of the two laser beams, has a complex structure, and is difficult to control.

SUMMARY

Embodiments of the present invention provide a spatial stereoscopic display device having advantages of simplified structure and easy controlled, and an operating method thereof.

In one aspect, an embodiment of the present invention provides a spatial stereoscopic display device, comprising: a laser source, connected with a 3D modulator and emitting laser light; a two-dimensional scanning unit, connected with the 3D modulator and receiving the laser light emitted by the laser source and projecting the laser light onto a variable isoclinic transflective unit according to specific addressing information under the control of the 3D modulator; the variable isoclinic transflective unit, receiving the laser light projected thereon by the two-dimensional scanning unit and dividing the laser light into a first splitting light and a second splitting light intersecting in an imaging space, by transmission and reflection; a power source and position sensor unit, connected with the variable isoclinic transflective unit to control an intersection of the first splitting light and the second splitting light in the imaging space; the imaging space, provided with an up-conversion material inside, and the up-conversion material at the intersection of the first splitting light and the second splitting light is excited to form a light-emitting point; and the 3D modulator, connected with the laser source, the two-dimensional scanning unit, the power source and position sensor unit to respectively control the laser source, the two-dimensional scanning unit, the power source and position sensor unit.

In another aspect, an embodiment of the present invention provides an operating method of the spatial stereoscopic display device mentioned above, comprising the following step of: adjusting and controlling the intensity of laser light emitted by the laser source, and adjusting and controlling the two-dimensional scanning unit and the variable isoclinic transflective unit, by using the 3D modulator under the control of a computer, so as to control addressing points of the laser light and hence allow two laser beams to travel in the imaging space along a specific addressing route, wherein space lattice or function relating to a 3D image to be displayed are inputted into the computer in advance.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 2:
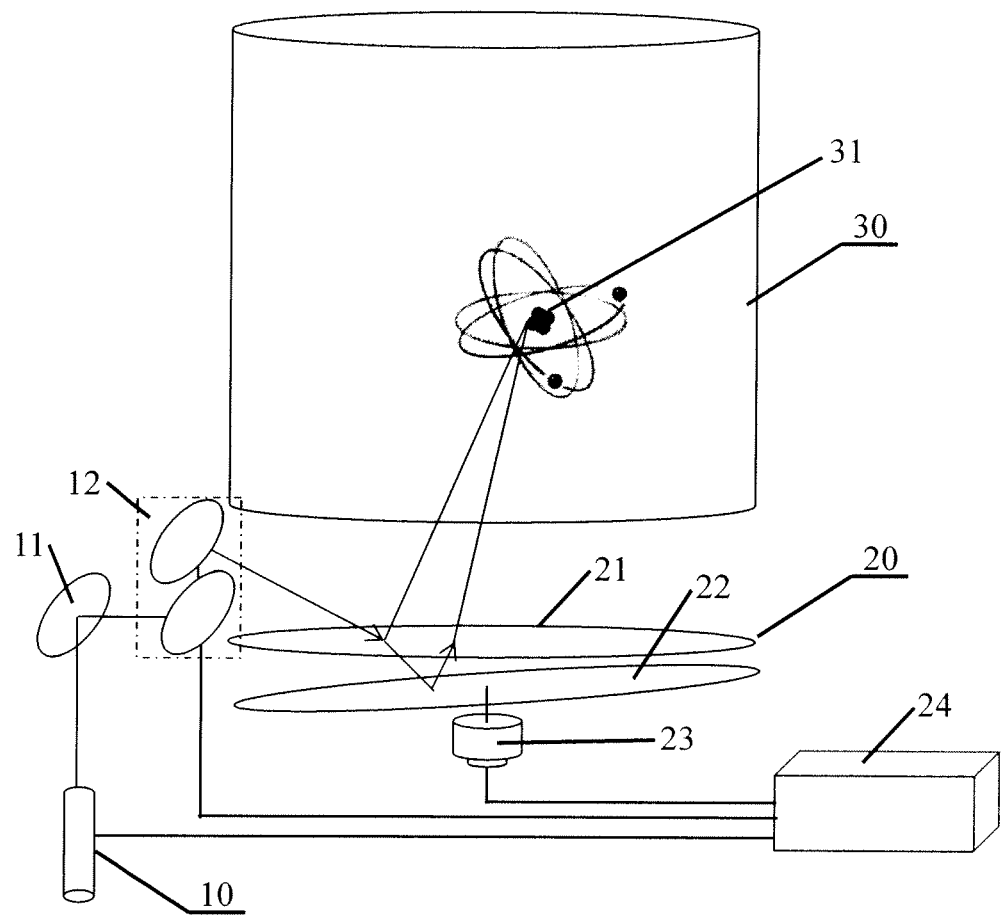
FIG. 2 is a schematic structural view of a spatial stereoscopic display device according to an embodiment of the invention.

FIG. 2 is a schematic structural view of a spatial stereoscopic display device according to an embodiment of the invention. As shown in FIG. 2, the spatial stereoscopic display device comprises a laser source 10, a two-dimensional scanning unit 12, a variable isoclinic transflective unit 20, a power source and position sensor unit 23, an imaging space 30 and a 3D modulator 24, wherein the laser source 10 is connected with the 3D modulator 24 and emits laser light; the two-dimensional scanning unit 12 is connected with the 3D modulator 24 and receives the laser light emitted by the laser source 10 and projects the laser light onto the variable isoclinic transflective unit 20 according to specific addressing information under the control of the 3D modulator 24; the variable isoclinic transflective unit 20 is used for receiving the laser light projected thereon by the two-dimensional scanning unit 12 and dividing the laser light into a first splitting light and a second splitting light intersecting in the imaging space 30, by transmission and reflection; the power source and position sensor unit 23 is connected with the variable isoclinic transflective unit 20 to control an intersection of the first splitting light and the second splitting light in the imaging space; the imaging space 30 is provided with an up-conversion material thereinside, and the up-conversion material at the intersection of the first splitting light and the second splitting light is excited to form a light-emitting point; and the 3D modulator 24 is connected with the laser source 10, the two-dimensional scanning unit 12 and the power source and position sensor unit 23 to respectively control the laser source 10, the two-dimensional scanning unit 12 and the power source and position sensor unit 23.

Exemplarily, the variable isoclinic transflective unit 20 includes a transflective film 21 and a reflector 22, wherein the reflector 22 is arranged under the transflective film 21 and obliquely arranged relative to the transflective film 21; and the power source and position sensor unit 23 connected therewith is arranged under the reflector 22. In addition, the reflector 22 has an initial inclination angle relative to the transflective film 21. During the imaging, the initial inclination angle is invariable, and only a distance between the reflector 22 and the transflective film 21, in a direction perpendicular to a plane where the transflective film is positioned, is varied. That is to say, the reflector 22 is controlled by the power source and position sensor unit 23 to vertically move up and down relative to the transflective film 21, and hence the distance between the reflector 22 and the transflective film 21, in the direction perpendicular to a plane where the transflective film is positioned, is varied. Moreover, the laser light incident on the surface of the transflective film 21 can be separated into reflected light and transmitted light by the transflective film 21, and the transmitted light transmits through the transflective film 21, is reflected by the reflector 22, and is refracted by the transflective film 21 and emitted out, so that one beam of laser light can be divided into two beams of intersected laser light via the variable isoclinic transflective unit 20. Actually, the intersecting of the two laser beams running through the variable isoclinic transflective unit 20 can only be achieved when the reflector 22 is obliquely arranged relative to the transflective film 21. If the reflector 22 is arranged parallel to the transflective film 21, the two laser beams may be emitted in parallel and cannot intersect, and hence the imaging cannot be achieved.

It should be noted that the term "variable isoclinic transflective unit" in an embodiment of the invention refers to a transflectiv unit in which the inclination angle of the reflector relative to the transflective film is invariable but the distance between the reflector and the transflective film, in the direction perpendicular to the plane where the transflective film is arranged, is variable.

Moreover, the imaging space 30 is provided with an up-conversion material 31 thereinside. The up-conversion is a process in which short-wavelength light can be excited by long-wavelength light. The up-conversion material is a light-emitting material capable of emitting visible light under the excitation of infrared light, namely a material converting the infrared light into the visible light. As the up-conversion material has the characteristic that the energy of absorbed photons is lower than that of emitted photons, which is contrary to the Stokes law, the up-conversion material is also known as an Anti-Atrokes law light-emitting material. In addition, the two laser beams running through the variable isoclinic transflective unit 20 finally intersect on the up-conversion material 31 which is then excited to emit light and a light-emitting point is formed. The up-conversion material 31 is uniformly distributed in the imaging space 30 so as to achieve the consistency of light emitting in the spatial stereoscopic display device. If the up-conversion material 31 is unevenly distributed, the phenomenon of uneven local brightness distribution may occur in the spatial stereoscopic display device, and hence the display effect can be affected.

Further, the up-conversion material 31 is uniformly distributed in the imaging space 30 to form a high-density spatial stereoscopic display device with the ensured isotropy and transparency. Exemplarily, the up-conversion material adopted in the spatial stereoscopic display device according to an embodiment of the invention is an up-conversion material with high performance found in the actual experiment, for example, a solid compound doped with rare earth elements such as fluoride glass doped with rare earth ions, sulfide glass doped with rare earth ions, tellurate glass doped with rare earth ions, bismuthate glass doped with rare earth ions, germanate glass doped with rare earth ions, oxyhalide glass doped with rare earth ions and the like, wherein the rare earth elements include lanthanide in the periodic table of elements, namely lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu), and two elements, scandium (Sc) and yttrium (Y), closely related to the 15 elements of lanthanide, 17 elements in total.

Figure 1:
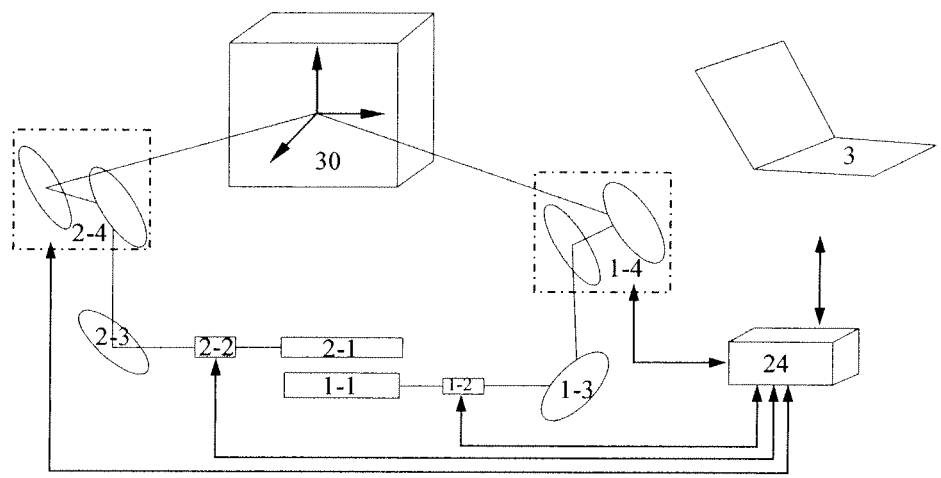
FIG. 1 is a schematic diagram of a current true 3D display system.

In an embodiment of the invention, a 3D image to be displayed is inputted into a computer in advance in a form of a space lattice or a function, and the computer achieves real-time control through the 3D modulator 24; the 3D modulator 24 is connected with the laser source 10 and used for modulating the laser light emitted by the laser source 10, and is connected with the two-dimensional scanning unit 12; a dichroic mirror is integrated into the two-dimensional scanning unit 12 and used for processing the laser light emitted by the laser source 10; and the 3D modulator 24 controls the two-dimensional scanning unit 12 to achieve the resolution and control of the address of the laser light, and is also connected with the power source and position sensor unit 23 and controls the power source and position sensor unit 23 to adjust the position of the reflector 22. In addition, the 3D modulator 24 adjusts and controls the intensity of the laser light emitted by the laser source 10 and adjusts and controls the two-dimensional scanning unit 12 and the variable isoclinic transflective unit 20, so as to control addressing points of the laser light. In such a way, the two laser beams travel in the imaging space 30 along the specific addressing route, and thus light-emitting points in the specific addressing route are excited to emit light at a specific frequency, and consequently the imaging can be achieved. Moreover, in order to adjust the intensity of the laser light emitted by the laser source 10, a lens 11 as illustrated in FIG. 1 may also be arranged to achieve the convergence of the laser light.

The specific operating principles of the spatial stereoscopic display device according to an embodiment of the invention are as follows: the laser light emitted by the laser source 10 and modulated by the 3D modulator 24 is projected onto the variable isoclinic transflective unit 20 and split into two laser beams by the reflection and transmission of the variable isoclinic transflective unit 20, and the two laser beams intersect on a voxel point of the up-conversion material 31 in the imaging space 30; after the laser light is subjected to resonance absorption of the up-conversion material 31 twice, electrons at a luminescence center are excited to higher excitation energy level, and the visible light is emitted during the transition of the electrons to the lower energy level; and accordingly, a light-emitting point may be formed in the up-conversion material 31, under the action of the two laser beams, in the imaging space 30. In addition, the two-dimensional scanning unit 12 scans the variable isoclinic transflective unit 20, and a surface pattern (non-horizontal surface) may be formed in the space. Moreover, the reflector 22 is moved by means of the power source and position sensor unit 23 in a direction perpendicular to a plane where the transflective film is arranged, and corresponding surface pattern (non-horizontal surface) may be formed in different spatial levels of the imaging space 30. Moreover, the intersection of the laser light travels along the trajectory in the imaging space 3D, and the route along which the intersection of the laser light travels forms a bright band capable of emitting visible light, namely a 3D image being consistent with the motion trajectory of the intersection of the laser beams can be displayed. By adoption of the display mode, a 360 degree visible 3D image can be seen by naked eyes, which is incomparable as compared to the current used two-dimensional display technology and virtual 3D display technology.

The spatial stereoscopic display device according to an embodiment of the invention is mainly composed of two parts, namely an image engine and a display module. As the imaging space is transparent, when the computer controls the intersection of the two laser beams to travel along the specific route in the imaging space 30 provided with the up-conversion material 31, the up-conversion material is excited by the two intersecting laser beams to emit light, thus, a 3D image can be observed. The image engine has a function of processing image data into appropriate forms and controlling peripheral equipment to direct the movement of the laser beams and the on-off of a photoelectric switch, so that the scanning can be performed at a specific address.

Moreover, an embodiment of the present invention also provides an operating method of any spatial stereoscopic display device described above, which comprises the following step of:

adjusting and controlling the intensity of laser light emitted by the laser source, and adjusting and controlling the two-dimensional scanning unit and the variable isoclinic transflective unit, by using the 3D modulator under the control of a computer, so as to control addressing points of the laser light and hence allow two laser beams to travel in the imaging space along a specific addressing route, wherein a space lattice or a function relating to a 3D image to be displayed are inputted into the computer in advance.

It can be seen from the above embodiment that: by arranging the variable isoclinic transflective unit, the laser light projected onto the variable isoclinic transflective unit by the laser source is split into two laser beams by the reflection and transmission of the variable isoclinic transflective unit; the two laser beams intersect on the up-conversion material of the imaging space to excite the up-conversion material to emit light, thus, forming a light-emitting point; and the addressing scanning in the 3D space is performed on the up-conversion material along the specific trajectory, and a 3D image being consistent with the motion trajectory of the intersection of the two laser beams can be displayed. The spatial stereoscopic display device has a simple structure, and has advantages of easy controlled, multi-viewing-angle, all-round viewing, multi-person simultaneous observation and so on.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A spatial stereoscopic display device, comprising:
    a laser source, connected with a 3D modulator and emitting laser light;
    a two-dimensional scanning unit, connected with the 3D modulator and receiving the laser light emitted by the laser source and projecting the laser light onto a variable isoclinic transflective unit according to specific addressing information under the control of the 3D modulator;
    the variable isoclinic transflective unit, receiving the laser light projected thereon by the two-dimensional scanning unit and dividing the laser light into a first splitting light and a second splitting light intersecting in an imaging space, by transmission and reflection;
    a power source and position sensor unit, connected with the variable isoclinic transflective unit to control an intersection of the first splitting light and the second splitting light in the imaging space;
    the imaging space, provided with an up-conversion material inside, and the up-conversion material at the intersection of the first splitting light and the second splitting light is excited to form a light-emitting point; and
    the 3D modulator, connected with the laser source, the two-dimensional scanning unit, the power source and position sensor unit to respectively control the laser source, the two-dimensional scanning unit, the power source and position sensor unit,
    wherein the variable isoclinic transflective unit includes a transflective film and a reflector arranged under the transflective film; the laser light from the two-dimensional scanning unit is directly projected onto the transflective film; and the reflector is obliquely arranged at an initial inclination angle relative to a plane where the transflective film is positioned,
    the reflector is movable, and
    there are a plurality of light-emitting points in the imaging space to provide a volumetric three dimensional image being consistent with a motion trajectory of the intersection of the first splitting light and the second splitting light.

2. The spatial stereoscopic display device according to claim 1, wherein one part of the laser light directly projected onto the transflective film is reflected by the transflective film to form the first splitting light, and the other part of the laser light directly projected onto the transflective film transmits through the transflective film, is reflected by the reflector, and transmits through the transflective film again to form the second splitting light.

3. The spatial stereoscopic display device according to claim 1, wherein the power source and position sensor unit connected therewith is arranged under the reflector; and
    the power source and position sensor unit is connected with the 3D modulator to control the movement of the reflector in a direction perpendicular to the plane where the transflective film is positioned with the invariable initial inclination angle.

4. The spatial stereoscopic display device according to claim 1, wherein the up-conversion material is uniformly distributed in the imaging space.

5. The spatial stereoscopic display device according to claim 4, wherein the up-conversion material is selected from the group consisting of fluoride glass, sulfide glass, tellurate glass, bismuthate glass, germanate glass and oxyhalide glass, doped with rare earth elements.

6. The spatial stereoscopic display device according to claim 1, further comprises: a lens, arranged between the laser source and the two-dimensional scanning unit and for converging the laser light emitted by the laser source.

7. The spatial stereoscopic display device according to claim 1, wherein the 3D modulator is used for controlling the laser source to modulate the intensity of the laser light emitted by the laser source.

8. An operating method for the spatial stereoscopic display device according to claim 1, comprising the following step of:
adjusting and controlling the intensity of laser light emitted by the laser source, and adjusting and controlling the two-dimensional scanning unit and the variable isoclinic transflective unit, by using the 3D modulator under the control of a computer, so as to control addressing points of the laser light and hence allow two laser beams to travel in the imaging space along a specific addressing route, wherein a pace lattice or a function relating to a 3D image to be displayed are inputted into the computer in advance.

* * * * *